H. EASTMAN.
Horse Rake.
No. 27,407.
Patented March 6, 1860.
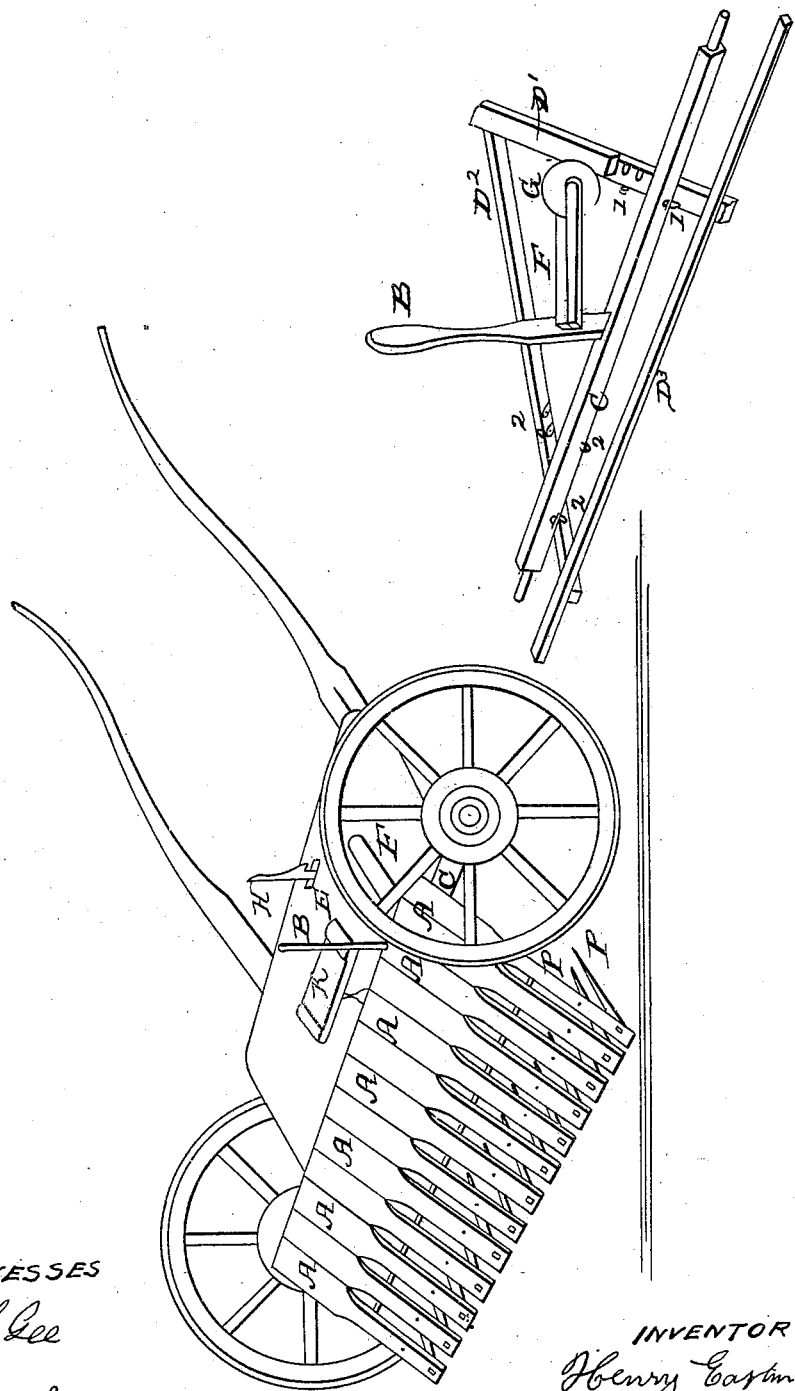
WITNESSES
INVENTOR
Henry Eastman.

UNITED STATES PATENT OFFICE.

HENRY EASTMAN, OF INDIANAPOLIS, INDIANA, ASSIGNOR TO D. HENDERSON, OF SAME PLACE.

IMPROVEMENT IN HORSE HAY-RAKES.

Specification forming part of Letters Patent No. 27,407, dated March 6, 1860.

*To all whom it may concern:*

Be it known that I, HENRY EASTMAN, of the city of Indianapolis, in the county of Marion and State of Indiana, have invented a new and useful Improvement in the Mode of Operating Horse-Rakes; and I do hereby declare that the following is a clear, full, and exact description of the construction and operation of the same, reference being had to the annexed drawings, making a part of this specification, in which—

Figure 1 is a perspective view of the rake, the other figures being sections thereof, and will be referred to as the case may require, like letters referring to the same things.

In Fig. 1, A represents a series of heads in which the teeth P are secured, and fastened by No. 10 wire to the heads. To the axle C are attached four (4) pieces of iron, one at each end, and the others, from equal distances from each other, having holes therein, through which passes a six-eighths rod of iron, upon which is strung the heads A by means of holes passing through the upper end thereof, which holes pass through from edge to edge. This arrangement enables them to yield readily to the operation of the lever B, which operates the triangular-shaped lever.

To the under side of the axle C the three pieces D' D² D³ are hung by the use of hinges 1 2 and 1 2. To the platform E is attached the lever B, having the arm F extending forward at right angles with the lever, having the roller G fastened in the slotted end and working on the piece D', which is at right angles with the piece D³, Fig. 2.

H is a latch, fastened to the platform E, used to hold the lever B when said lever is used to operate the triangular-shaped lever that raises the teeth from the ground, and holds them in an elevated position while moving the rake over any space when it is not used in raking grass or grain or moving it from field to field.

The three pieces of wood D', D², and D³ form the triangular-shaped lever, and are that part of the machine by which, with the use of the lever B, the workman elevates at pleasure the teeth from the ground and deposits the bundle of hay or grain at any given point required, or raises them when passing over stumps or rooty ground.

The manner of operating the rake is as follows: After the horse is attached and the driver in readiness he sets forth, and when the teeth of the rake have become sufficiently full and require to be dumped he takes hold of the handle B, lowers it toward the platform E, in which operation the roller G, coming in contact with the frame D' of the triangular-shaped lever and the piece D³ and presses against each and every head A, causes them to rise to such a height that the hay or grain is deposited at any time or place required. The teeth, being set in the heads A of the rake at an angle of about fifty-six degrees, do not require to be elevated but a little distance from the ground before the grain is deposited. Hence with little or no difficulty the hay or grain can be deposited at equal distances, as above shown.

In the brake or triangular-shaped lever are arranged different sets of hinges 1 2 to give additional leverage, as the abundance of grass or grain may require a change therein.

The roller G is used to lessen the friction and labor in elevating teeth by the triangular-shaped lever.

What I claim as my invention, and desire to secure by Letters Patent, is—

The arrangement of the toothed rake-heads A P, triangular frame D' D² D³, axle C, hand-lever B, arm F, friction-roller G, and catch H, substantially in the manner and for the purpose herein described.

HENRY EASTMAN.

Witnesses:
R. S. GEE,
SOLOMON RUTHENBURY.